US012568428B2

(12) United States Patent
Thubert et al.

(10) Patent No.: US 12,568,428 B2
(45) Date of Patent: Mar. 3, 2026

(54) INTER-PAN LOAD/SIZE BALANCING CONTROLLED BY ENROLLMENT PRIORITY IN LLNs

(71) Applicant: Cisco Technology, Inc., San Jose, CA (US)

(72) Inventors: Pascal Thubert, Roquefort les Pins (FR); Huimin She, Shanghai (CN); Li Zhao, Shanghai (CN); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 498 days.

(21) Appl. No.: 17/671,712

(22) Filed: Feb. 15, 2022

(65) Prior Publication Data

US 2023/0064808 A1 Mar. 2, 2023

Related U.S. Application Data

(60) Provisional application No. 63/236,714, filed on Aug. 25, 2021.

(51) Int. Cl.
*H04W 48/18* (2009.01)
*H04L 43/0876* (2022.01)
(Continued)

(52) U.S. Cl.
CPC ......... *H04W 48/18* (2013.01); *H04L 43/0876* (2013.01); *H04W 24/08* (2013.01); *H04W 36/12* (2013.01); *H04W 48/08* (2013.01)

(58) Field of Classification Search
CPC ... H04W 48/18; H04W 48/008; H04W 48/06; H04W 24/08; H04W 24/02; H04W 24/10;
(Continued)

(56) References Cited

U.S. PATENT DOCUMENTS 8,934,366 B2 1/2015 Hui et al.
9,565,108 B2 2/2017 Hui et al.
(Continued)

OTHER PUBLICATIONS

Farag et al., "Congestion-Aware Routing in Dynamic IoT Networks: A Reinforcement Learning Approach", May 20, 2021, [online], [retrieved on Oct. 22, 2021]. Retrieved from the Internet: URL: <https://arxiv.org/pdf/2105.09678.pdf>, 6 pages.
(Continued)

*Primary Examiner* — Jianye Wu
(74) *Attorney, Agent, or Firm* — Lee & Hayes, P.C.

(57) ABSTRACT

In one embodiment, a method comprises: first determining, by a controller, a target load for each of at least first and second wireless data networks rooted by respective first and second root network devices; second determining, by the controller, that at least a prescribed minimum number of network devices attached within the first wireless data network need to migrate from the first wireless data network to the second wireless data network based on the respective target loads; and causing, by the controller, the prescribed minimum number of network devices to migrate from the first wireless data network to the second wireless data network, based on the controller sending to the first and second root network devices enrollment priorities to be advertised by the first and second root network devices, respectively.

20 Claims, 11 Drawing Sheets

(51) Int. Cl.

| | |
|---|---|
| *H04W 24/08* | (2009.01) |
| *H04W 36/12* | (2009.01) |
| *H04W 48/08* | (2009.01) |

(58) Field of Classification Search

CPC ....... H04W 36/12; H04W 4/70; H04W 88/12; H04L 43/0876

See application file for complete search history.

(56) References Cited

U.S. PATENT DOCUMENTS

| | | | |
|---|---|---|---|
| 9,935,868 B2 | 4/2018 | Hui et al. | |
| 2006/0129771 A1* | 6/2006 | Dasgupta | G06F 3/0605 711/162 |
| 2012/0117268 A1* | 5/2012 | Shaffer | H04W 40/28 709/238 |
| 2014/0204759 A1 | 7/2014 | Guo et al. | |
| 2017/0078170 A1 | 3/2017 | Vasseur et al. | |
| 2018/0167314 A1 | 6/2018 | Kim et al. | |
| 2018/0331940 A1 | 11/2018 | Jadhav et al. | |
| 2019/0363976 A1* | 11/2019 | Thubert | H04L 45/306 |
| 2019/0394737 A1 | 12/2019 | Luo | |
| 2020/0120107 A1* | 4/2020 | McGrew | G06N 20/00 |
| 2020/0162944 A1 | 5/2020 | Barton et al. | |

OTHER PUBLICATIONS

Richardson et al., "Controlling Secure Network Enrollment in RPL networks", ROLL Working Group, Internet-Draft, Aug. 9, 2021, [online], [retrieved on Dec. 30, 2021]. Retrieved from the Internet: UTL: <draft-ietf-roll-enrollment-priority-05.pdf>, pp. 1-9.

She et al., "Location-Aware Personal Area Network Migration for Lowpower and Lossy Networks", Cisco 2017, IP.com No. IPCOM000251158D, Oct. 19, 2017, 5 pages.

Chen et al., "Service-Aware Node Migration for Low-Power and Lossy Networks", Cisco 2017, IP.Com No. IPCOM000251469D, Nov. 2, 2017, 15 pages.

Winter, Ed., et al., "RPL: IPv6 Routing Protocol for Low-Power and Lossy Networks", Internet Engineering Task Force (IETF), Request for Comments: 6550, Mar. 2012, [online], [retrieved on Mar. 29, 2018]. Retrieved from the Internet: URL: <https://tools.ietf.org/pdf/rfc6550.pdf>, pp. 1-157.

Sebastian et al., "Load Balancing Optimization for RPL Based Emergency Response Using Q-Learning", International Journal of Science and Technology, Aug. 23, 2018, [online], [retrieved on Oct. 22, 2021]. Retrieved from the Internet: URL: <https://pdfs.semanticscholar.org/58c3/8b3c6eef9cb9ba1bf41052345f60c8487f9d.pdf>, pp. 74-92 (19 pages).

* cited by examiner

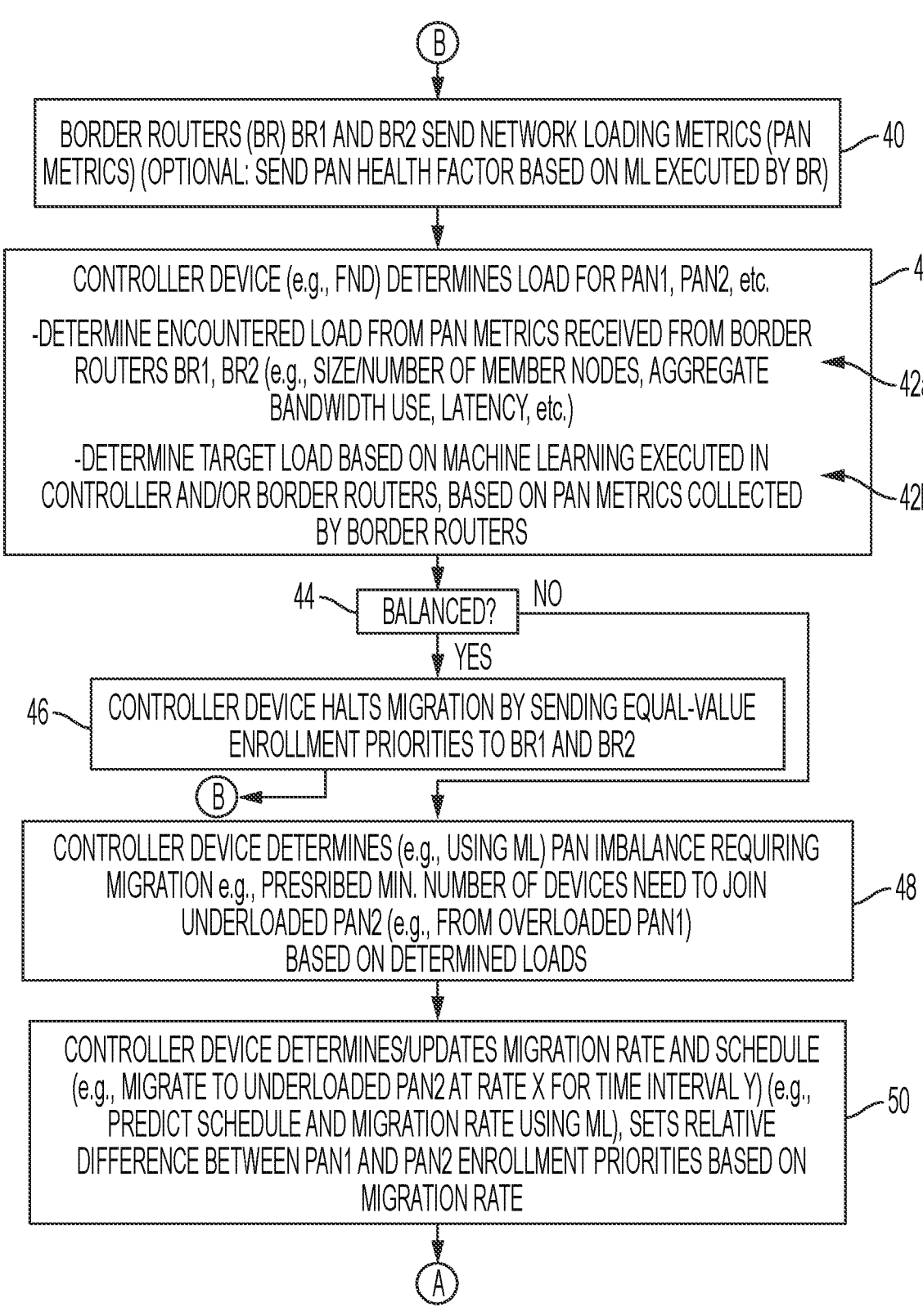

B

BORDER ROUTERS (BR) BR1 AND BR2 SEND NETWORK LOADING METRICS (PAN METRICS) (OPTIONAL: SEND PAN HEALTH FACTOR BASED ON ML EXECUTED BY BR) — 40

CONTROLLER DEVICE (e.g., FND) DETERMINES LOAD FOR PAN1, PAN2, etc. — 42

-DETERMINE ENCOUNTERED LOAD FROM PAN METRICS RECEIVED FROM BORDER ROUTERS BR1, BR2 (e.g., SIZE/NUMBER OF MEMBER NODES, AGGREGATE BANDWIDTH USE, LATENCY, etc.) — 42a -DETERMINE TARGET LOAD BASED ON MACHINE LEARNING EXECUTED IN CONTROLLER AND/OR BORDER ROUTERS, BASED ON PAN METRICS COLLECTED BY BORDER ROUTERS — 42b

44 — BALANCED?          NO

YES

46 — CONTROLLER DEVICE HALTS MIGRATION BY SENDING EQUAL-VALUE ENROLLMENT PRIORITIES TO BR1 AND BR2

B

CONTROLLER DEVICE DETERMINES (e.g., USING ML) PAN IMBALANCE REQUIRING MIGRATION e.g., PRESRIBED MIN. NUMBER OF DEVICES NEED TO JOIN UNDERLOADED PAN2 (e.g., FROM OVERLOADED PAN1) BASED ON DETERMINED LOADS — 48

CONTROLLER DEVICE DETERMINES/UPDATES MIGRATION RATE AND SCHEDULE (e.g., MIGRATE TO UNDERLOADED PAN2 AT RATE X FOR TIME INTERVAL Y) (e.g., PREDICT SCHEDULE AND MIGRATION RATE USING ML), SETS RELATIVE DIFFERENCE BETWEEN PAN1 AND PAN2 ENROLLMENT PRIORITIES BASED ON MIGRATION RATE — 50

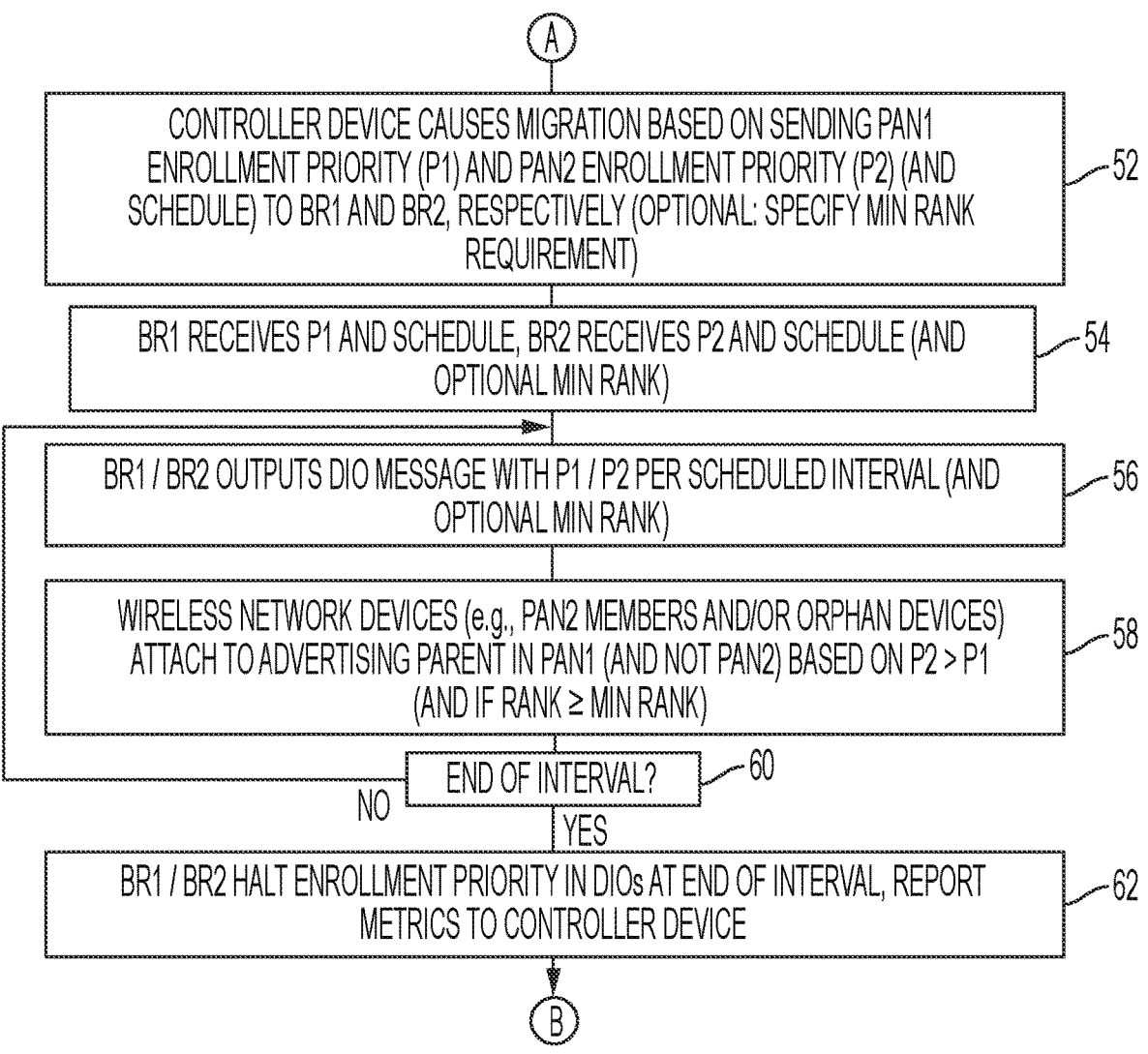

CONTROLLER DEVICE CAUSES MIGRATION BASED ON SENDING PAN1 ENROLLMENT PRIORITY (P1) AND PAN2 ENROLLMENT PRIORITY (P2) (AND SCHEDULE) TO BR1 AND BR2, RESPECTIVELY (OPTIONAL: SPECIFY MIN RANK REQUIREMENT) ~52

BR1 RECEIVES P1 AND SCHEDULE, BR2 RECEIVES P2 AND SCHEDULE (AND OPTIONAL MIN RANK) ~54

BR1 / BR2 OUTPUTS DIO MESSAGE WITH P1 / P2 PER SCHEDULED INTERVAL (AND OPTIONAL MIN RANK) ~56

WIRELESS NETWORK DEVICES (e.g., PAN2 MEMBERS AND/OR ORPHAN DEVICES) ATTACH TO ADVERTISING PARENT IN PAN1 (AND NOT PAN2) BASED ON P2 > P1 (AND IF RANK ≥ MIN RANK) ~58

END OF INTERVAL? ~60

NO          YES

BR1 / BR2 HALT ENROLLMENT PRIORITY IN DIOs AT END OF INTERVAL, REPORT METRICS TO CONTROLLER DEVICE ~62

FIG. 3B 14, 16, 18

DEVICE INTERFACE CIRCUIT — 30

PROCESSOR CIRCUIT
(E.G., MICROPROCESSOR CIR., MULTI-PROCESSOR CORE CIR., ASIC,ETC.) — 32

MEMORY CIRCUIT — 34

INTER-PAN LOAD/SIZE BALANCING CONTROLLED BY ENROLLMENT PRIORITY IN LLNs

This application claims priority to Provisional Application No. 63/236,714, filed Aug. 25, 2021.

TECHNICAL FIELD

The present disclosure generally relates to Inter-Personal Area Network (PAN) Load/Size Balancing controlled by Enrollment Priority in low power and lossy networks (LLNs).

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks: such low-power router devices can be referred to as LLN devices, or "RPL nodes" in the case of low-power router devices utilizing the Routing Protocol for Low Power and Lossy Networks (RPL) as described in the Internet Engineering Task Force (IETF) Request for Comments (RFC) 6550, "RPL: IPv6 Routing Protocol for Low-Power and Lossy Networks". Each LLN node in the LLN typically is constrained by processing power, memory, and energy (e.g., battery power); interconnecting wireless links between the LLN nodes typically are constrained by high loss rates, low data rates, and instability with relatively low packet delivery rates. A network topology (e.g., a "RPL instance") can be established based on creating routes in the form of a directed acyclic graph (DAG) toward a single "root" network device, also referred to as a "DAG root" or a "DAG destination". Hence, the DAG also can be referred to as a Destination Oriented DAG (DODAG). Network traffic moves either "up" towards the DODAG root or "down" towards the DODAG leaf nodes.

The Wi-SUN (Wireless Smart Utility Networks) alliance provides an interoperable wireless standards-based solution mainly for utility applications, such as distribution automation (DA). This kind of wireless data network is usually composed by multiple PANs (Personal Area Networks). Each PAN includes a border router (BR) as the root network device and hundreds of wireless network nodes, forming a corresponding multi-hop wireless mesh network (also called a Low Power and Lossy Network). The wireless network nodes are connected through wireless links. The data network is managed by a Field Network Director (FND) which is located at a remote site (e.g., via a Wide Area Network)

An unbalanced network might cause packet loss due to congestion, low bandwidth etc. Therefore, in an ideal LLN, nodes should be evenly distributed to different PANs.

BRIEF DESCRIPTION OF THE DRAWINGS

Reference is made to the attached drawings, wherein elements having the same reference numeral designations represent like elements throughout and wherein:

FIGS. 3A-3B illustrate an example method by the controller device of FIG. 1 providing balancing between wireless data networks based on allocating enrollment priority values, according to an example embodiment.

DESCRIPTION OF EXAMPLE EMBODIMENTS

Figure 1:
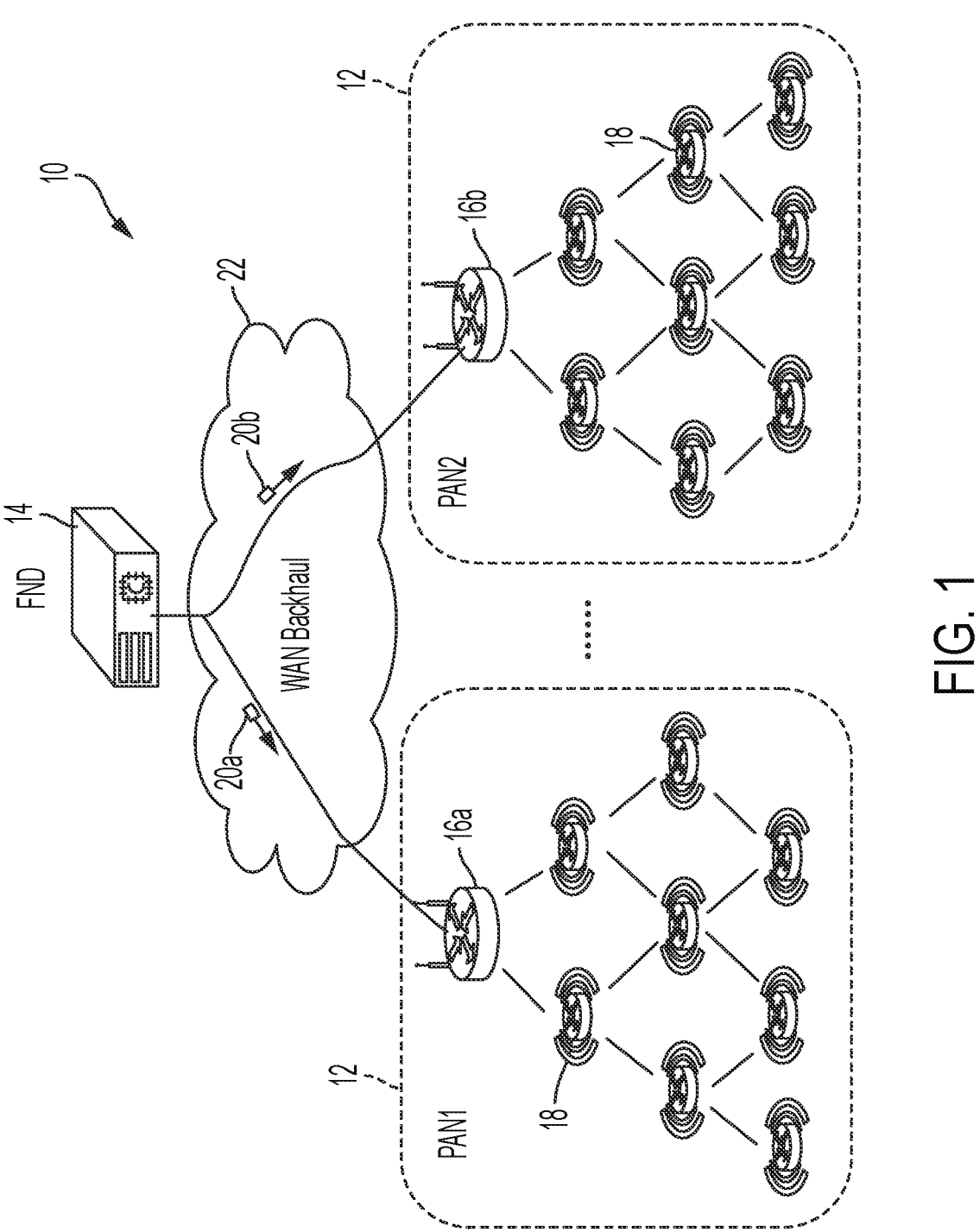
FIG. 1 illustrates an example data network (e.g., a Wi-SUN network) comprising multiple wireless data networks, each comprising a border router and wireless network devices, and the data network further comprising a controller device configured for providing balancing between the wireless data networks based on allocating by enrollment priority values in the wireless data networks, according to an example embodiment.

In one embodiment, a method comprises: first determining, by a controller device, a load for each of at least a first wireless data network and a second wireless data network, the first and second wireless data networks rooted by respective first and second root network devices; determining, by the controller device based on the respective loads, that a plurality of network devices need to migrate to the second wireless data network; and causing, by the controller device, the plurality of network devices to attach to the second wireless data network and not the first wireless data network, based on the controller device sending enrollment priorities to be advertised by the first and second root network devices, respectively.

In another embodiment, one or more non-transitory tangible media are encoded with logic for execution by a machine and when executed by the machine operable for: first determining, by the machine implemented as a controller device, a load for each of at least a first wireless data network and a second wireless data network, the first and second wireless data networks rooted by respective first and second root network devices; determining, by the controller device based on the respective loads, that a plurality of network devices need to migrate to the second wireless data network; and causing, by the controller device, the plurality of network devices to attach to the second wireless data network and not the first wireless data network, based on the controller device sending enrollment priorities to be advertised by the first and second root network devices, respectively.

In another embodiment, an apparatus is implemented as a physical machine and comprises: non-transitory machine readable media configured for storing executable machine readable code; a device interface circuit configured for communications with first and second wireless data networks rooted by respective first and second root network devices; and a processor circuit. The processor circuit is configured for executing the machine readable code, and when executing the machine readable code operable for: first determining a load for each of at least the first wireless data network and the second wireless data network; determining, based on the respective loads, that a plurality of network devices need to migrate to the second wireless data network; and causing the plurality of network devices to attach to the second wireless data network and not the first wireless data network, based on the apparatus sending enrollment priorities to be advertised by the first and second root network devices, respectively.

DETAILED DESCRIPTION

Particular embodiments enable balancing between multiple wireless data networks implemented, for example, as personal area networks (PANs) or Destination Oriented Directed Acyclic Graphs (DODAGs), where a controller device can provide inter-PAN (or inter-DODAG) node balancing based on sending selected enrollment priorities to root network devices of the respective wireless data networks.

The Internet Engineering Task Force (IETF) Draft by Richardson et al, "Controlling Secure Network Enrollment in RPL networks" (draft-ietf-roll-enrollment-priority-05) (hereinafter "IETF draft by Richardson et al.") describes how a root network device can place a value called minimum enrollment priority in a Destination Oriented Directed Acyclic Graph (DODAG) Information Object (DIO) message that is flooded down the DODAG. This minimum enrollment priority indicates a relative desirability by the root network device to "grow" the DODAG (or not) with additional wireless network devices that attach to the DODAG. Use of DIO messages to build a DODAG are described in further detail, for example, in the IETF RFC 6550. Wireless routers can then increase that value to expose to the nodes that care candidate to join.

The example embodiments enable the controller device to cause balancing between wireless data networks based on the controller device determining a load for each wireless data network, determining that network devices need to migrate, and sending enrollment priority values to the root network devices of the respective wireless data networks. The enrollment priority values allocated by the controller device can cause the root network devices to advertise the enrollment priority values that cause network devices to migrate to a wireless data network based on the enrollment priority values.

FIG. 1 illustrates an example physical data network 10, for example a Wi-SUN network 10 comprising multiple wireless data networks "PAN1", "PAN2" 12 implemented for example as Personal Area Networks (PANs), and a controller device 14. Each PAN 12 comprises a border router device 16 (also referred to herein as a root network device) and wireless network devices 18, for example Internet of Things (IoT) devices. The controller device 14, also referred to as a Field Network Director (FND) device 14, is configured for providing Inter-PAN Load/Size Balancing based on allocating, to each border router device 16, a corresponding enrollment priority 20. Each enrollment priority 20 can be transmitted, by the controller device 14, to a corresponding destination border router device 16 via a local and/or wide area network (WAN) 22.

The example embodiments address the following inter-DODAG balancing problem: it is very difficult for a root network device 16 to select an enrollment priority value that will result in balanced DODAGs (e.g., "PAN1" and "PAN2" in FIG. 1), where "balancing" can be based on various loading metrics such as size of a PAN 12 in number of nodes, or the load in throughput, etc. For example, a border router device 16a can increase an enrollment priority upon detecting load saturation in the corresponding "PAN1" 12, however the border router device 16a cannot determine the effect of changing the enrollment priority. Consequently, the increase in enrollment priority by a border router device 16a in a PAN (e.g., "PAN1") 12 can cause ("push") saturation onto the next adjacent DODAGs (e.g., "PAN2") 12, creating oscillations in saturations between the PANs "PAN1" and "PAN2", as each border router device 16a and 16b attempts to successively increase enrollment priority to mitigate load saturation. Hence, attempts at controlling enrollment priority as a distributed protocol can result in oscillations in load saturations between neighboring PANs 12. Algebra-based attempts do not solve the problem.

Prior attempts to rebalance the DAGs in a distributed fashion also never really solved the problem of oscillating saturations. At best, oscillations were limited with dampening. Examples of the distributed attempts include: U.S. Pat. Nos. 8,934,366 and 9,565,108 proposed to use distributed node migration to balance the load across different LLN interfaces. In order to prevent the "herding" problem, it devised a weighted coin-toss process based on the proportional difference of the NetSize, Weight, and TrafficRate parameter.

Another attempt included using adaptive switch hold time instead of a constant one to avoid oscillation or delayed convergence, which is calculated based on the network depth NetDepth and Beta parameter. Besides, explicit leave notification is introduced to speed up migration process.

Another attempt challenged the fact that node migration easily becomes a critical bottleneck of LLN service, and provides a service-friendly solution that allows nodes to migrate between PANs with awareness of service quality, reliability, and availability.

Another attempt proposed a location-aware PAN migration strategy. The devices during migration select the PAN mainly based on the physical location of the field area router (FAR) operating as a root network device. The PAN size and rank are used as auxiliary information. It can mitigate the slow convergence problem and greatly accelerate the migration process. None of the above attempts, however, solved the problem of mitigating saturation without creating oscillations between wireless data networks.

Hence, use of enrollment priority to mitigate saturation without introducing oscillations between wireless data networks cannot be accomplished without providing coordination between adjacent root network devices 16a and 16b.

The example embodiments can eliminate the adverse effects of oscillating saturations between PANs 12, without the necessity of algebra-based compute solutions (that appear to approach NP difficulty), based on the example embodiments centralizing the selection of enrollment priorities at a controller node 14, illustrated in FIGS. 1 and 4-9. As described in further detail below, the controller device 14, implemented for example as a Wi-SUN FND, can be configured to apply selected values of enrollment priorities 20 to selected root network devices 16 for selected time intervals in a selected sequence.

In particular, the example embodiments are based on executing balancing between PANs 12 based on the controller device 14 causing by migration from a loaded PAN (e.g., "PAN2") 12 to one or more neighboring PANs having less loads.

Each wireless data network (e.g., "PAN1", "PAN2") 12 can be implemented as an Internet Protocol version 6 (IPv6) wireless radio frequency (RF) mesh network, deployed for example using wireless link layer protocols such as IEEE 802.15.4e, IEEE 802.15.4g (referred to herein as "IEEE 802.15.4e/g"), and/or IEEE 802.15.5. In particular, each PAN 12 can be implemented as a smart grid Advanced Metering Infrastructure (AMI) network that can utilize a connected grid mesh (CG-Mesh) that comprises a field area router (FAR) 16 implemented as a root network device (e.g., "Root 1") and thousands of LLN devices 18, where each LLN device 18 can possibly reach, within its transmission range of its corresponding wireless data link, hundreds of neighboring LLN devices 18. The root network device (e.g., "Root 1") 16 can be implemented, for example, based on a commercially-available Cisco® Connected Grid Router (CGR) such as the CGR 1000 Series, commercially available from Cisco Systems, San Jose, California, modified as described herein. Hence, the root network device 16 also is referred to as a CGR, a DAG root, a DODAG root, or a root network device "CGR".

The root network device (e.g., "Root 1") 16 is configured for establishing, within the PAN 12, a "Personal Area Network" (PAN) having prescribed PAN identifier (e.g., "PAN 1"). The root network device (e.g., "Root 1") 16 also is configured for generating a DAG-based topology for the PAN based on outputting multicast DODAG information object (DIO) messages, for example according to RFC 6550, enabling the wireless network devices 18 to establish a DODAG rooted at the root network device (e.g., "Root 1") 16.

The wireless network devices 18 can be deployed, as part of an AMI network, within an urban environment as wireless outdoor devices (e.g., "poletop") devices deployed for forwarding network traffic to and from the root network device (e.g., "Root 1") 16.

Each wireless RPL network device 18 in the wireless data network 10 normally can join a DODAG 12 in response to receiving a multicast message (36 of FIGS. 4A, 4B) such as a DIO message via wireless data links (i.e., under normal wireless conditions providing reliable wireless data links). Each wireless mesh network device 18 can be implemented as a constrained network device, or "LLN device" or "CG-mesh" device, configured for operating for example as a RPL node according to RFC 6550.

Each "child" network device (e.g., "A") 18 detecting the multicast DIO message output by the root network device (e.g., "Root 1" 16a) can select the root network device (e.g., "Root 1" 16a) as a parent in the identified DODAG (e.g., "PAN1") 12 based on comparing network topology metrics (advertised in the multicast DIO message) to a prescribed objective function of the RPL instance. The "child" network device (e.g., "A") 18, upon attaching to its parent, can output its own updated multicast DIO message with updated network topology metrics (e.g., rank identifier "Rank 1") that enable other wireless mesh network devices 18 to discover the DODAG 12, learn the updated network topology metrics, and select a DODAG parent. Hence, the network devices 18 can join the DODAG 12 in response to receiving a multicast DIO message from an advertising DODAG parent device, and selecting the DODAG parent as a default route.

Downward routes (i.e., away from the DAG root) 12 can be created based on unicast Destination Advertisement Object (DAO) messages that are created by a wireless mesh network device 18 and unicast transmitted to the DAG root 16. In non-storing mode the RPL nodes 18 do not store downward routing tables, hence a RPL node 18 unicasts its DAO message to the DAG root 16, such that all data packets are sent to the DAG root 16 and routed downward with source routes inserted by the DAG root 16.

Figure 9:
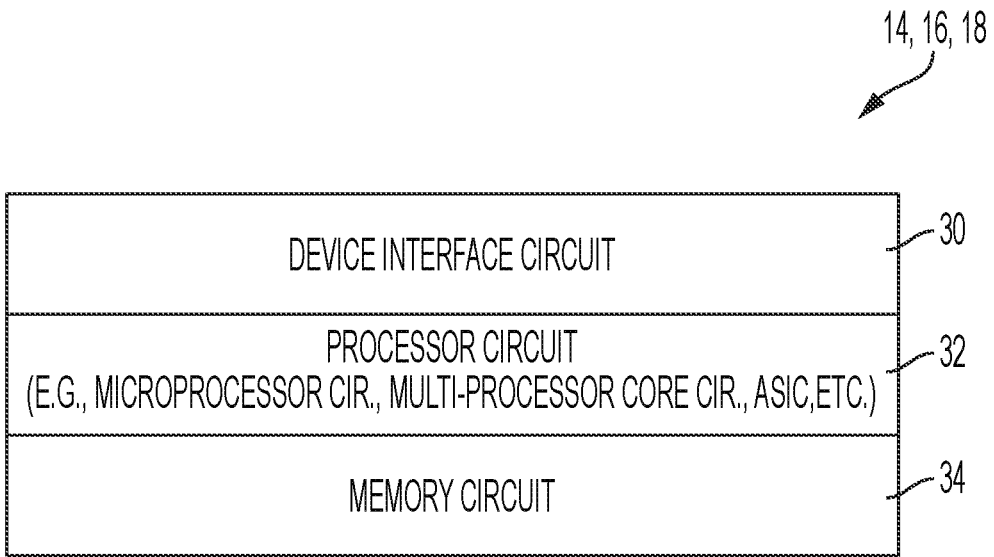
FIG. 9 illustrates an example implementation of any one of the network devices of FIGS. 1 and 3-8, according to an example embodiment.

The DAG root 16, in response to receiving the DAO messages from the RPL nodes 18, can build the entire nonstoring DODAG topology 12 in accordance with RFC 6550, and store the DAG topology 12 in its memory circuit (34 of FIG. 9).

All the network devices, including the root network device (e.g., "Root 1") 16 and the LLN devices 18, can output a corresponding routing advertisement message (e.g., a DIO message). Further, all the LLN 18 devices can have one or more attachments (illustrated in the Figures as lines in between the network devices), where each attachment is used to illustrate an optimized next-hop path chosen for an identifiable objective function.

Figure 2:
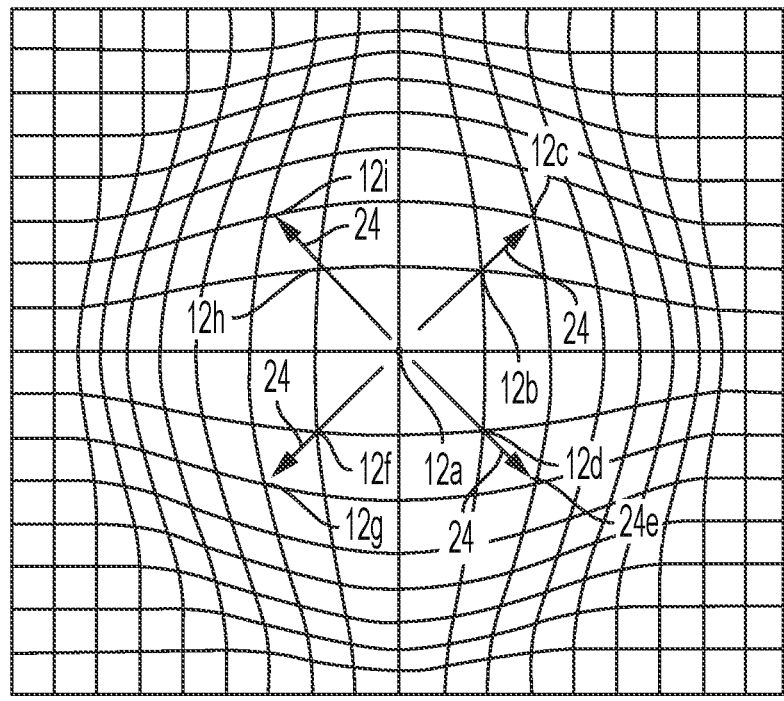
FIG. 2 illustrates migration of network devices from a loaded wireless data network to neighboring wireless data networks, according to an example embodiment.

FIG. 2 illustrates migrating network devices from a loaded PAN to neighboring PANs, according to an example embodiment. The Wi-SUN network 10 can include a plurality of PANs 12, where each PAN 12 is illustrated as an intersecting line. FIG. 2 illustrates a collection of RPL DODAGs (including DODAGs 12a through 12i) as a three-dimensional patchwork having a height in the "z" direction extending from the plane of FIG. 2, the "z" direction representing a corresponding "load" on a given PAN 12. Hence, the "z" direction represents the "load" on a given PAN 12, and the flat X-Y plane of FIG. 2 represents the relative X-Y positions of the PANs 12 in the Wi-SUN network 10. By way of analogy, the "z" direction represents a variable surface of "sand", where the PANs 12 would be evenly load balanced if the grid was uniform (all PANs 12 having an equal height "z"), in other words the PANs 12 would be balanced if the "sand" is flat in FIG. 2.

As illustrated in FIG. 2, the PAN 12a illustrates a peak "mountain in the middle" having a peak loading relative to the neighboring PANs 12b through 12i; in other words, the controller device 14 can determine that PAN 12a has a peak load, the PANs 12b, 12d, 12f, and 12h have a lower load than the PAN 12a, and the PANs 12c, 12e, 12g, and 12i have a lower load than any of the PANs 12b, 12d, 12f, or 12h.

According to example embodiments, the controller device 14 can output selected enrollment priorities 20 to the respective roots 16 of each of the PANs 12a through 12i to "press down" the load encountered by the PAN 12a, enabling a migration 24 of IoT devices 18 from the PAN 12a toward the outer PANs 12c, 12e, 12g, and 12i in order to provide a more even distribution of load among the PANs 12 in the Wi-SUN network 10. In other words, the controller device 14 can effectively "press down" the load encountered by the PAN 12a by causing its corresponding border router device 16a to output an enrollment priority (e.g., "P1=200") indicating the undesirability of joining the PAN 12a in order to cause migration of a plurality of IoT devices 18 toward neighboring PANs 12b, 12d, 12f, and 12h; similarly, the controller device 14 can "press down" the load encountered the neighboring PANs 12b, 12d, 12f, and 12h by causing the respective border router devices 16 to output enrollment priorities (e.g., "P2=150") that cause the migration of IoT devices 18 toward the neighboring PANs 12*c*, 12*e*, 12*g*, 12*i* that can output enrollment priorities (e.g., "P3=100"). A lower enrollment priority value represents a relatively higher desirability for accepting new wireless network devices 18 as member network devices.

Hence, the controller device 14 can output selected enrollment priorities 20 to respective border router devices 16 that advertise, to the IoT devices 18 detecting the DIO messages comprising the enrollment priority 20, the PAN 12*a* as the least desirable DODAG 12 to join (based on the enrollment priority "P1=200" 20), the PANs 12*b*, 12*d*, 12*f*, and 12*h* as more desirable than the PAN 12*a* (based on the enrollment priority "P2=150" 20), and the PANs 12*c*, 12*e*, 12*g*, 12*i* even more desirable than the PANs 12*b*, 12*d*, 12*f*, and 12*h* (based on the enrollment priority "P3=100" 20). As described in further detail below, the controller device 14 can control the rate of the migration 24 based on the relative difference between the enrollment priorities 20 to be advertised by respective border router devices 16, for an identified time interval; in other words, a greater migration rate can be accomplished by a greater difference in enrollment priorities 20 between neighboring PANs 12, and a greater overall migration can be accomplished using a greater migration rate and/or a longer identified time interval for advertising the different enrollment priorities 20. Following the migration 24 the controller device 14 can update the enrollment priorities 20 with equal-value enrollment priorities among the PANs 12*a* through 12*i* to halt the migration 24. If desired, additional "leaking" (or "low-rate migration") can be executed based on other PANs 12 outside the periphery of the PANs 12*a* through 12*i* advertising lower enrollment priorities.

FIGS. 3A-3B illustrate an example method by the controller device 14 of FIG. 1 providing Inter-PAN Load/Size Balancing based on allocating enrollment priorities 20 in LLNs 12, according to an example embodiment. The processor circuit (32 of FIG. 9) of each border router device 16 of each PAN 12 (e.g., 16*a*, 16*b*) in operation 40 can detect network loading metrics for its corresponding PAN 12 (e.g., "PAN1", "PAN2"), and send the network loading metrics to the controller device 14. Example loading metrics can include PAN size/number of member IoT devices 18 attached within the PAN 12, aggregate bandwidth in use in the PAN 12, number of routes in the PAN 12, energy consumed in the PAN 12, latency encountered in the PAN 12, etc. As described below, each PAN 12 in operation 40 can detect one or more network loading metrics based on analytics executed by the processor circuit 32 of a PAN 12, and/or based on various performance metrics originated by one or more of the IoT devices 18 in the corresponding PAN 12.

Each border router device 16 in operation 40 also can execute machine learning (ML) in order to determine a PAN "health factor" (HF) for the corresponding PAN 12. For example, the processor circuit (32 of FIG. 9) of each border router device 16 in operation 40 can determine a health factor using a known metric such as the overall packet loss, average transit time delay, average jitter (or any related statistical quantities such as the wireless transmission medium, ninetieth percentile (90%), etc.). In another embodiment, the PAN HF can be determined based on execution of a polynomial function using one or more metrics (note that such health functions are used by products such as the commercially-available Cisco DNA center for other networking entities such as the mobile device, a switch or a router).

Each border router device 16 in operation 40 also can execute ML operations, including for example a regression function (e.g. using Deep Learning, or Gradient Boosted trees) to compute the PAN HF using a series of input features such as the DODAG number of nodes, overall topology (number of layers, average number of nodes per layer, etc.) physical span of the PAN 12, localization (city vs countryside, etc.), breakout of applications being used in the DODAG mesh (obtained using the commercially-available Cisco Network Based Application Recognition (NBAR) on the DODAG root 12). The Cisco DNA center and the Cisco NBAR are commercially available from Cisco Systems, San Jose, California.

Although the regression function can be executed by the DODAG root 12, any associated training can be executed by the controller device 14 and/or in a cloud-based computing system where more memory, CPU resources are available. In other words, the controller device 14 can execute the machine learning, on behalf of the PANs 12, to determine the corresponding PAN health factor based on received loading metrics. Hence, the processor circuit 32 of the controller device 14 in operation 42 can collect a set of input features (including network loading metrics, PAN HFs) from one or more DODAG roots 16, and determine a load for each of the PANs 12 based on the supplied input features. For example, the processor circuit 32 of the controller device 14 in operation 42*a* can determine an encountered load by each PAN 12 based on the received network loading metrics and/or PAN HF from the corresponding border router device 16; alternately, the processor circuit 32 of the controller device 14 in operation 42*b* can determine a target load for a PAN 12 that is determined based on execution of machine learning using the metrics associated with the corresponding PAN 12, including network loading metrics, corresponding PAN HF, etc.

The processor circuit 32 of the controller device 14 in operation 42 also can compute a single regression function that can be shared between all DODAGs 12 in the network 10. Telemetry (e.g., network loading metrics, etc.) can be collected in operation 42 by the controller device 14 upon request, or at regular intervals using actual telemetry or sampled values of the input features retrieved from a border router device 16 and/or one or more selected IoT devices 18; hence, telemetry can be aggregated from IoT devices 18 by a border router device 16 and forwarded to the controller device 14, and/or the telemetry can be retrieved by the controller device 14 from a specific identified IoT device 18, as desired. Hence, a DODAG root 16 can update the PAN HF value on a regular or periodic basis, and/or when a significant change is observed (e.g., an increase/decrease by more than prescribed percentage, etc.).

In yet another embodiment the PAN HF can be computed (e.g., by a border router device 16 in operation 40 and/or the controller device 14 in operation 42) according to node and application characteristics. In mesh or cell network where QoS per Class of Service (CoS) is enabled it becomes possible to load balance according to the CoS. In such a case the regression function can be calculated based on the CoS, thus leading to multiple values of HF, one per CoS.

Hence, a computing device (e.g., the border router device 16 in operation 40 and/or the controller device 14 in operation 42) can maximize objectives, such as number of joined nodes, etc. while maintaining the PAN health factor above a threshold. Based on the learning operations, the border router device 16 in operation 40 and/or the controller device 14 in operation 42b can compute acceptable load values for number of nodes and throughput for each PAN 12, and can compute additional loads that can be added to each PAN 12, as well as the projections of these additional loads in the near future based on experience on the speed at which the loads change.

The border router device 16 in operation 40 and/or the controller device 14 in operation 42 also can execute ML-based longer term analysis to determine the projected value for a PAN HF based on seasonal decomposition using an algorithm such as Prophet or Fourier transform. Hence, the border router device 16 and/or the controller device 14 can determine loads based on trend and seasonality for either the input features (number of clients devices 18, etc.) or the HF (or HF per CoS) itself. Hence, the border router device 16 and/or the controller device 14 can detect a seasonal phenomenon potentially leading to rejecting (or discouraging) a new node to join a cell (or DODAG) 12 if it is expected to see many other nodes joining the cell or DODAG in a near future.

Hence, the controller device 14 in operation 42 computes the target load for each DODAGs 12, and decides in operation 44 whether the PANs 12 are balanced in terms of target number of member nodes 18, or where and/or when nodes need to migrate from a high (loaded) DODAG to a lower (least loaded) ones.

If in operation 44 the processor circuit 32 of the controller device 14 determines that the PANs 12 are balanced in terms of load (actual encountered load and/or target loads based on ML-based projections), the processor circuit 32 of the controller device 14 in operation 46 can halt any migration based on setting all enrollment priorities 20 to an equal value (illustrated in FIG. 6 as equal to "EP=50" and "EP=60" in FIG. 8), and sending the equal-value enrollment priorities 20 to each of the PANs 12 for advertisement of the equal-value enrollment priorities 20 in respective DIO messages.

If in operation 44 the processor circuit 32 of the controller device 14 determines imbalance in the actual or target loads among the PANs 12, the processor circuit 32 in operation 48 can determine the amount of PAN imbalance that requires migration, including for example determining a prescribed minimum number of IoT devices 18 that need to migrate to an "underloaded" or "underutilized" PAN 12; as described below, the migration can be directed to "orphan" (i.e. unattached) nodes 18 that do not yet belong to any PAN 12, or the migration can be directed to "member" nodes that need to migrate from an "overloaded" PAN (e.g., 12a of FIG. 2) to underloaded PANs (e.g., 12b through 12i of FIG. 2).

The processor circuit 32 of the controller device 14 in operation 50 can compute a target load "TLi" for each DODAG "i" and a sequence of "pressures" and duration for each border router device 16, where a "pressure" indicates a migration rate based on a relative difference between enrollment priorities 20 between neighboring PANs 12 for a prescribed duration, also referred to as a migration interval. Hence, the processor circuit 32 of the controller device 14 in operation 48 can compute a scheduled sequence of enrollment priorities 20 for each border router device 16.

Referring to FIG. 3B and as illustrated in FIG. 1, the controller device 14 in operation 52 can generate and send instructions to each of the border router devices 16 that cause the scheduled sequence of enrollment priorities (e.g., "P1" for "PAN1" 12, "P2" for "PAN2" 12, etc.) 20 to be installed by the border router devices 16 in operation 54. As described below, the instructions generated and sent in operation 52 can include minimum rank requirements that identifies a minimum rank required for migration, preventing an IoT device 18 having a rank less than an advertised minimum rank requirement from migrating from a first wireless data network 12 to a second wireless data network 12 during the current migration interval. As illustrated in FIG. 4, the controller device 14 can generate and output to the border router device 16a in operation 52 a corresponding allocated enrollment priority "P1" 20a; the controller device 14 also can generate and output to the border router device 16b in operation 52 a corresponding allocated enrollment priority "P2" 20b.

Each border router device 16 in operation 54 can receive the instructions, including the corresponding enrollment priority 20 and associated policies including deployment rules (e.g., a time and duration of a migration interval for advertising the specified enrollment priority 20). Hence, each border router device 16 in operation 56 can generate and output, within its corresponding PAN 12, a DIO message (and/or link layer beacon message, as appropriate) that specifies the allocated enrollment priority 20 according to the deployment rules (e.g., migration time interval duration/ schedule, etc.) set by the controller device 14.

Figure 4A:
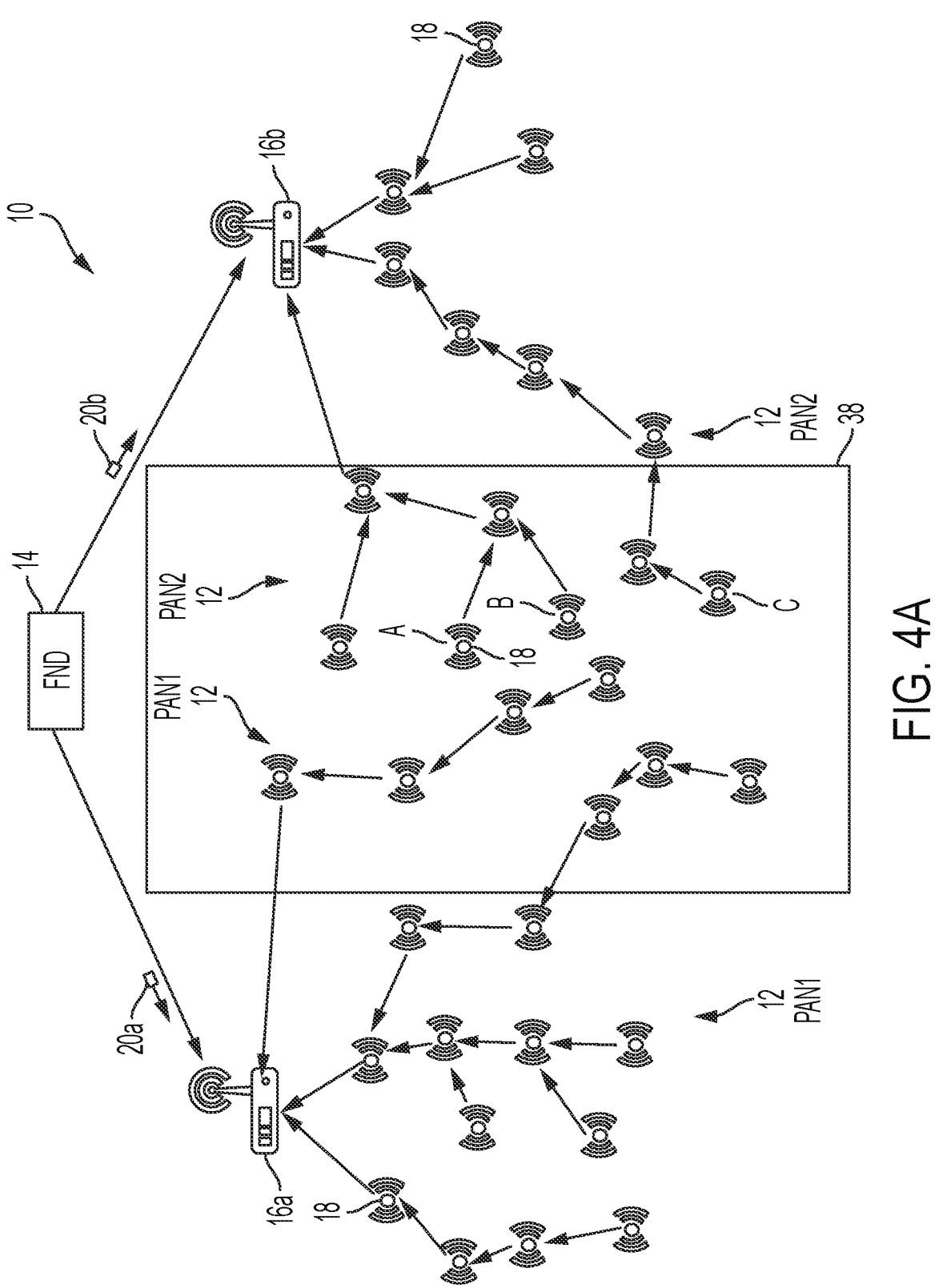
FIGS. 4A and 4B illustrate wireless network devices in a second wireless data network receiving advertisement messages originated from the first wireless data network, for causing migration to the first wireless data network, according to an example embodiment.
Figure 4B:
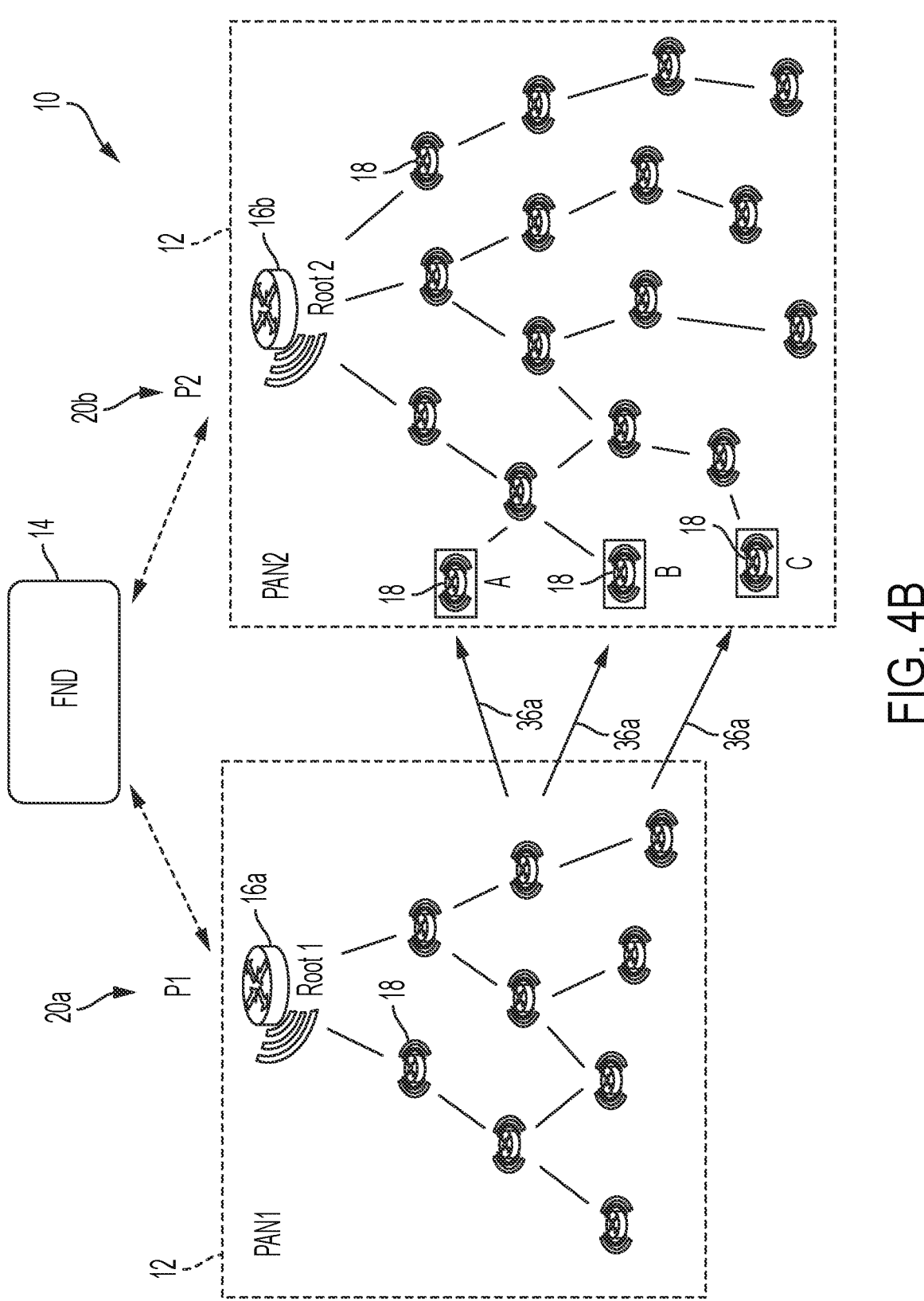

As illustrated in FIG. 4A, IoT devices 18 within a "border area" 38 are within transmission range of both the "PAN1" 12 and the "PAN2" 12: if security does not permit receiving DIO messages from a neighboring PAN, IoT devices attached in one PAN (e.g., "PAN2") can obtain the enrollment priority "P1" 20a from link layer beacons. Hence, each IoT device 18 in the border area 38 can select whether to join the "PAN1" 12 or the "PAN2" 12 based on received DIO/ beacon messages 36a (FIG. 4B) and 36b (FIG. 5) initiated by the border router devices 16a and 16b, respectively. Hence, as illustrated in FIG. 4B, the DIO message/beacon message initiated and output by the border router device 16a can be propagated throughout the "PAN1" 12 by the attached IoT devices 18, enabling the neighboring IoT devices 18 in the neighboring "PAN2" 12 to detect the DIO message/beacon message 36 initiated by the border router device 16a.

Figure 5:
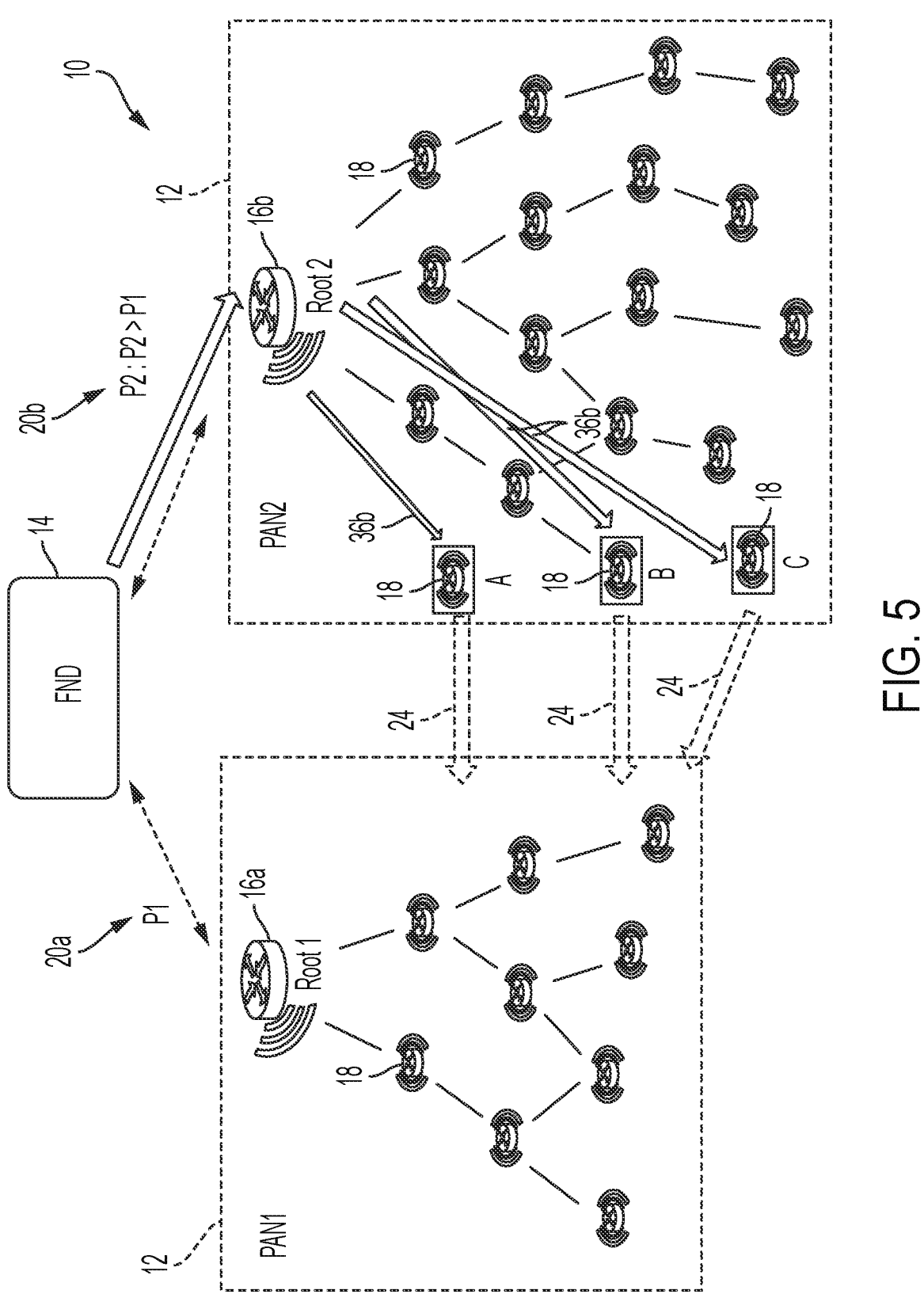
FIG. 5 illustrates the controller device causing migration by network devices from the second wireless data network to the first wireless data network, according to an example embodiment.

The DIO/beacon messages 36a output by the border router device 16a in operation 56 and specifying the enrollment priority "P1" 20a can cause attached IoT devices "A", "B", and "C" 18 in the "PAN2" 12 to compare the enrollment priority "P1" 20a advertised by the border router device 16a with the enrollment priority "P2" 20b advertised in the DIO/beacon message 36b generated and output by the border router device 16b in FIG. 5.

As illustrated in FIG. 5, the attached IoT devices "A", "B", and "C" 18 in operation 58 can determine that the enrollment priority "P1" 20a advertised by the border router device 16a is less than the enrollment priority "P2" 20b advertised by the border router device 16b, causing the IoT devices "A", "B", and "C" 18 to migrate (operation 24 of FIG. 5) from the "PAN2" 12 to the "PAN1" 12. If the DIO/beacon message 36a also specifies a minimum rank requirement, then the IoT devices "A", "B", and "C" 18 attached in the "PAN2" 12 can selectively migrate in operation 24 to the "PAN1" 12 based on determining their respective ranks in the "PAN2" 12 are greater than or equal to the minimum rank requirement. Hence, if the minimum rank requirement is "MIN RANK=200" and the IoT devices "A", "B", and "C" 18 have ranks "RANK A=150", "RANK B=225", and "RANK C=275" in the "PAN2" 12, the IoT devices "B" and "C" can determine that they can execute migration 24 to the "PAN1" 12, whereas the IoT device "A" 18 cannot migrate during the current migration interval based on determining its rank is less than the minimum rank requirement, i.e., "RANK A<MIN RANK".

Use of the minimum rank requirement enables the controller device 14 to manage migration operations 24 to ensure that higher-rank IoT devices (further from a border router device 16*b*) migrate before any lower-rank IoT devices that are closer to the border router device 16*b*, ensuring no disruption in network topology for existing IoT devices relying on a parent IoT device to remain attached within the same network. The controller device 14 can cause lower-rank IoT devices (closer to the border router device 16*b*) to migrate during a later migration interval, illustrated below.

If in operation 60 each border router device 16 has determined that the current advertisement time interval for the allocated enrollment priority 20 (i.e., migration interval) has expired, the border router device 16 in operation 62 can optionally halt transmission of the allocated enrollment priority 20 and report updated load metrics to the controller device 14. Alternately, each border router device 16 can output updated load metrics (and/or PAN HF values) to the controller device 14, and at the end of the first advertisement interval at operation 60 each border router device 16 can initiate scheduled advertisement in operation 56 of the next scheduled enrollment priority 20. The controller device 14 also can cause the border router devices 16 to update the minimum rank requirement to a lower value for the next migration interval, enabling the IoT devices (e.g., "A") closer to the border touter device 16*b* to migrate to the "PAN1" 12.

Figure 6:
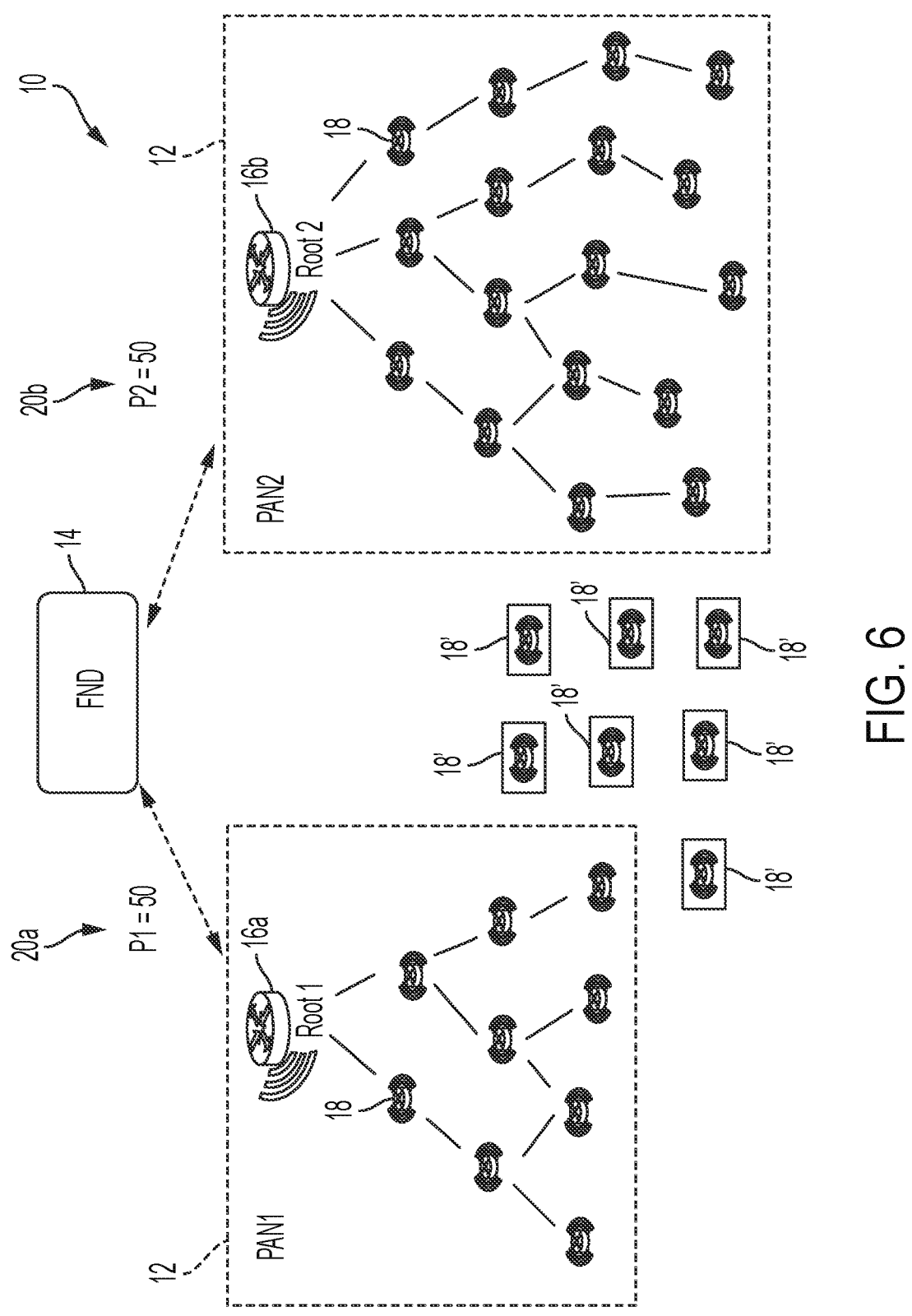
FIG. 6 illustrates the controller device initiating formation of balanced first and second wireless data networks for new network devices based on equal-value enrollment priority values, according to an example embodiment.
Figure 7:
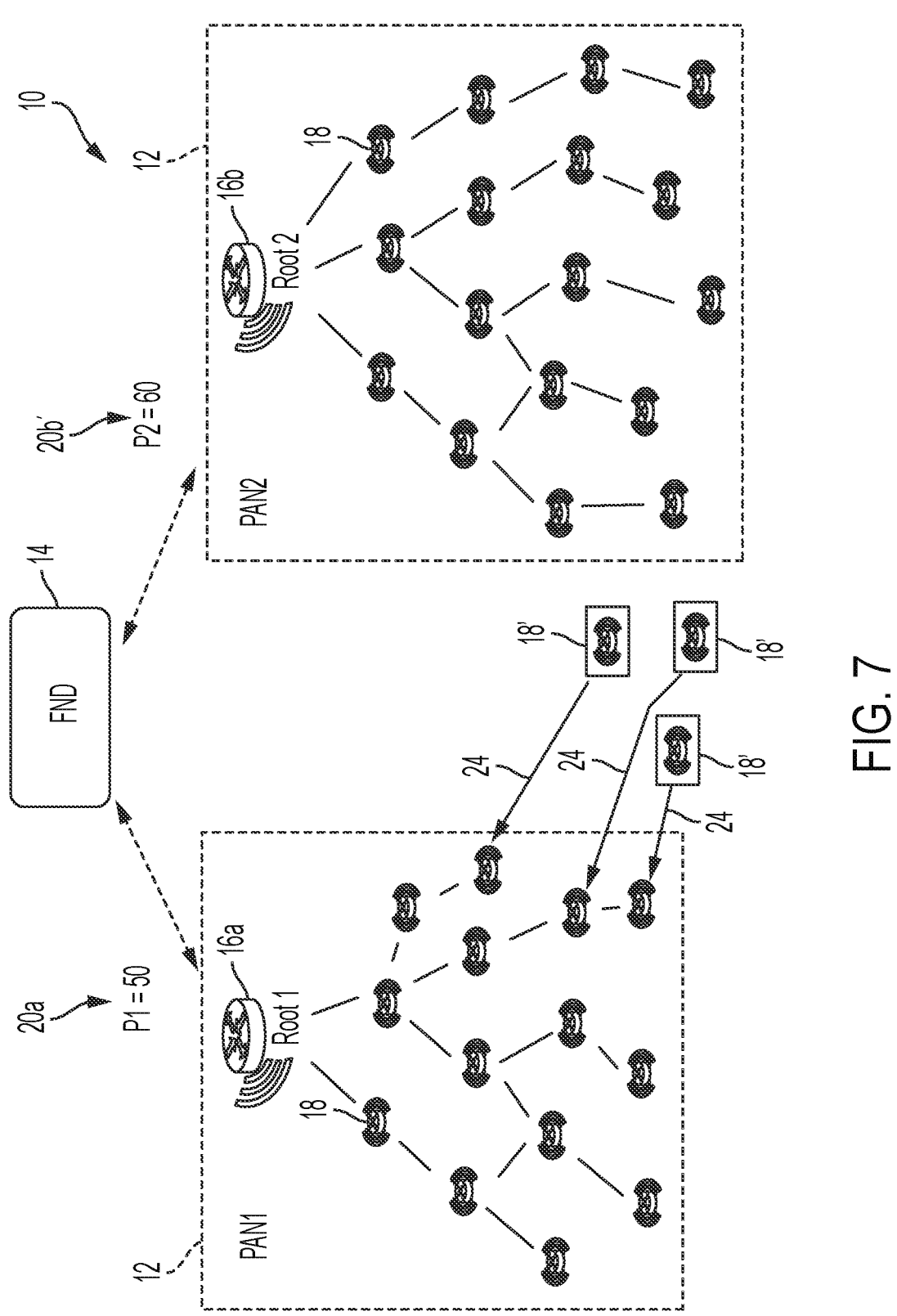
FIG. 7 illustrates rebalancing first and second wireless data networks for new network devices based on different-value enrollment priority values, according to an example embodiment.
Figure 8:
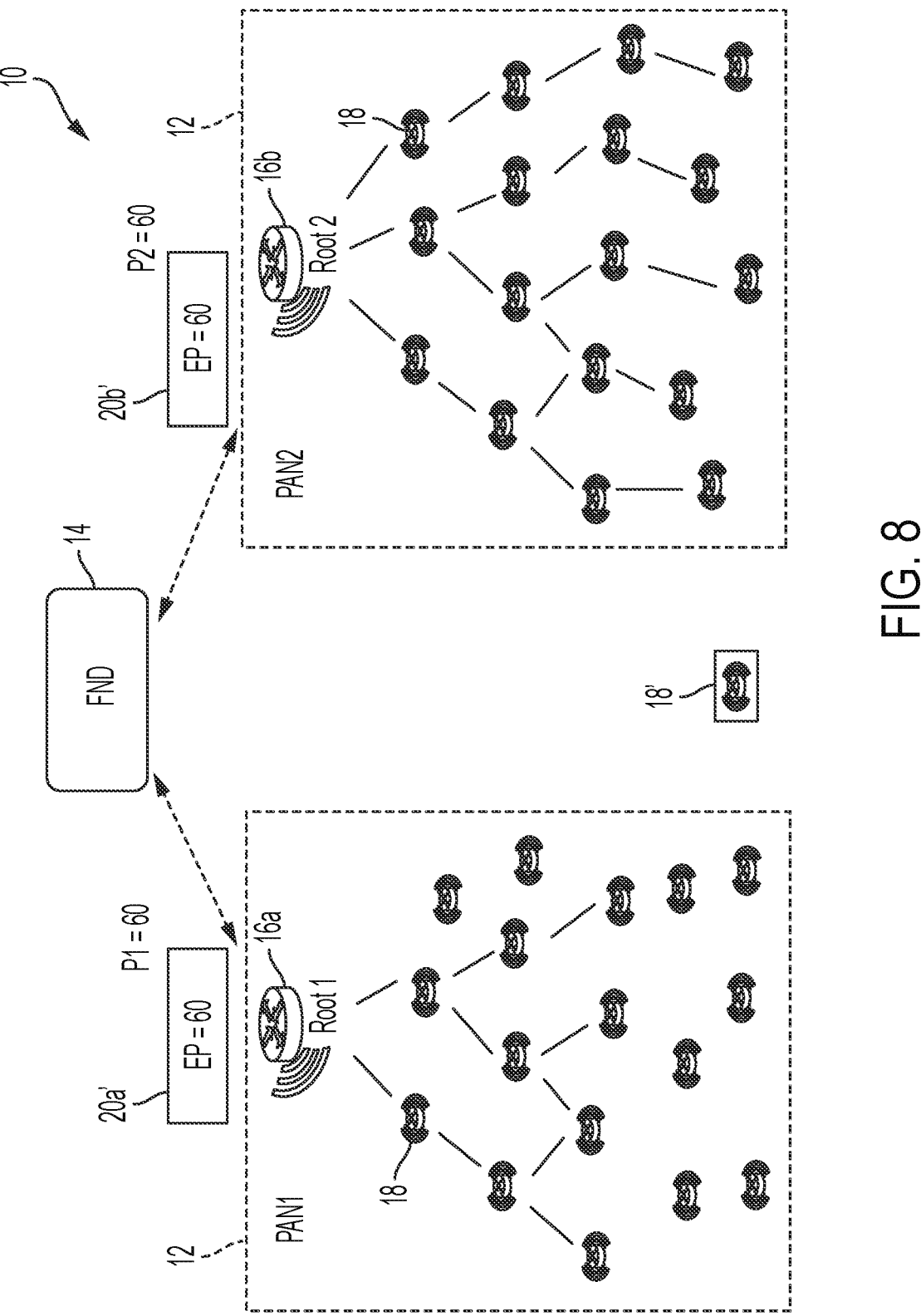
FIG. 8 illustrates resuming balanced first and second wireless data networks for new network devices based on equal-value enrollment priority values, according to an example embodiment.

Similarly, orphaned (or unattached) IoT devices 18', illustrated in FIGS. 6-8 can selectively execute migration 24 in operation 58 based on detecting different enrollment priorities 20. As illustrated in FIG. 6, the controller device 14 can output initial enrollment priorities 20*a* and 20*b* having equal values "P1=P2=50", which normally would cause the orphan nodes 18' to randomly select the "PAN1" or the "PAN2" 12.

A change in the enrollment priority 20*b* by the controller device 14 to the updated value "P2=60" 20*b'* of FIG. 7 can cause the border router device 16*b* to output updated DIO/beacon messages 36 with the updated value 20*b'*. As illustrated in FIG. 7, the updated enrollment priority 20*b'* causes the orphan IoT devices 18' to migrate 24 toward the border router device 16*a* (or an attached IoT device 18 within the associated "PAN1" 12) that is advertising a "preferred" enrollment priority "P1=50" 20*a* that is less than the updated enrollment priority "P2=60" 20*b'*. The controller device 14 can cause an update in the enrollment priorities to ensure even balancing between the "PAN1" 12 and the "PAN2" 12, for example based on updating the enrollment priority "P1" 20*a* to the updated enrollment priority "P1=60" 20*a'* that equals the updated enrollment priority "P2=60" 20*b'*, illustrated in FIG. 8, effectively halting the "pressure" for IoT devices to migrate toward a PAN 12.

Hence, regular or constant feedback by the border router device 16 enables the controller device 14 to adjust the schedule and/or migration rate depending detecting a higher or lower migration rate between the PANs 12. Hence, the controller device 14 can learn the responsiveness in migration between different PANs 12, and can thus adjust and improve the relative differences in enrollment priorities 20 for the next scheduled migration interval. As described previously, the relative difference between the values of the enrollment priorities 20 enables the IoT devices 18 to determine the relative "aggressiveness" of the migration 24, i.e., the relative migration rate induced by the controller device 14.

Hence, referring to FIG. 6 the controller device 14 can initially set the initial enrollment priorities 20*a* and 20*b* to a base (minimum) value of "P1=P2=50" in operation 46 of FIG. 3A for each PAN 12 in the Wi-SUN network 10, causing each border router device 16 to output a DIO/beacon message 36 with the base enrollment priority value of "Pi=50". Hence, IoT devices 18 can begin joining a PAN 12, causing the controller device 14 to periodically collect in operation 42 the size (i.e. number of nodes) of all PANs 12.

If in operation 44 the FND detects the size of two/multiple neighboring PAN are very different, and their differences exceed a threshold (indicating unbalanced PANs 12), the controller device 14 in operation 48 and 50 can adjust the enrollment priority 20 of these PANs, as shown in FIG. 7, and send to the border router device 16*b* the updated enrollment priority "P2=60" 20*b'* in operation 52. As illustrated in FIG. 7, the FND 14 can provide a larger EP value 20*b'* to the "PAN2" having a larger number of member nodes, so that new joining nodes (i.e., the orphan nodes 18') will more likely choose the smaller-size "PAN1" over the larger-size "PAN2". In other words, a joining node 18' can respond to receiving DIOs from PAN1 with EP=50 and PAN2 with EP=60 by more likely joining "PAN1" in operation 58 of FIG. 3B.

Hence, the relative size of PANs 12 can gradually become balanced, as reported by the border router devices 16 to the controller device 14 in operation 40 of FIG. 3A. In response to the FND 14 detecting in operation 42 the sizes of two/multiple neighboring PANs are comparable, the controller device 14 in operation 44 can determine the neighboring PANs 12 are balanced, and in response adjust in operation 46 the enrollment priorities again to halt migration 24, for example, based on setting the enrollment priority "P1" 20*a'* for the "PAN1" 12 and the enrollment priority "P2" 20*b'* to equal "P1=P2=60", as shown in FIG. 8. The above PAN balancing mechanism can be executed dynamically, so that joined nodes might be able to migrate to a neighbor PAN with less nodes.

As described previously, the IETF draft by Richardson et al. describes a RPL DIO option that can be used to announce an enrollment min priority, which expresses (when increasing) a decreasing willingness by the RPL DODAG globally to accept new joins. However the IETF draft by Richardson et al. does not explain how the root computes enrollment min priority, and the IETF draft by Richardson et al. does not mention how to the enrollment min priority could be used for PAN rebalancing.

According to example embodiments, an FND can set the value at each root network device to achieve a globally optimized balance. The FND can respond to detected changes in load (e.g., size, throughput, etc.) by different PANs based on the FND scheduling selected values of min priority values for selected root network devices for selected durations in a selected sequence. Hence, the FND can effectively exert "pressure" on different PANs based on changing a relative difference of enrollment priorities that can cause IoT device to migrate to a PAN advertising a relatively smaller enrollment priority.

FIG. 9 illustrates an example implementation of any one of the devices 14, 16, and/or 18 in any of the Figures, according to an example embodiment. Each apparatus 14, 16, and/or 18 is a physical machine (i.e., a hardware device) configured for implementing network communications with other physical machines 14, 16, and/or 18 via the physical data network shown in the Figures. The term "configured for" or "configured to" as used herein with respect to a specified operation refers to a device and/or machine that is physically constructed and arranged to perform the specified operation.

Each apparatus 14, 16, and/or 18 can include a device interface circuit 30, a processor circuit 32, and a memory circuit 34. The device interface circuit 30 can include one or more distinct physical layer transceivers for communication with any one of the other devices 14, 16, and/or 18; for example, the device interface circuit 30 can include an IEEE 802.15.4e transceiver for wireless deterministic network communications, for example based on sending and receiving data packets via a wireless data link according to a prescribed wireless data link protocol. The processor circuit 32 can be configured for executing any of the operations described herein, and the memory circuit 34 can be configured for storing any data or data packets as described herein.

Any of the disclosed circuits of the devices 14, 16, and/or 18 (including the device interface circuit 30, the processor circuit 32, the memory circuit 34, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 34) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 34 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 34 can be implemented dynamically by the processor circuit 32, for example based on memory address assignment and partitioning executed by the processor circuit 32.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:

first determining, by a Wi-SUN (Wireless Smart Utility Network) controller device, a current load and a target load for each of at least a first wireless data network and a second wireless data network, wherein the first wireless data network and the second wireless data network are rooted by respective first and second root network devices, and wherein the target load represents a desired goal state for distributing load between the first wireless data network and the second wireless data network;

determining, by the Wi-SUN controller device and based on a difference between the current load and the target load for each of the first wireless data network and the second wireless data network, that a plurality of network devices need to migrate from the first wireless data network to the second wireless data network; and causing, by the Wi-SUN controller device, the plurality of network devices to attach to the second wireless data network and not the first wireless data network, based on the Wi-SUN controller device sending enrollment priorities to be advertised by the respective first and second root network devices.

2. The method of claim 1, wherein the first determining includes determining the current load as:

an encountered load by each of the first wireless data network and the second wireless data network based on network loading metrics received from the respective first and second root network devices, respectively.

3. The method of claim 1, wherein the causing includes controlling a rate of migrating from the first wireless data network to the second wireless data network, based on controlling a relative difference between the enrollment priorities to be advertised by the respective first and second root network devices, respectively.

4. The method of claim 3, wherein the causing further includes setting an identified schedule for the rate of migrating, causing the respective first and second root network devices to advertise the enrollment priorities for an identified interval.

5. The method of claim 1, further comprising:
detecting, by the Wi-SUN controller device, updated loads in the first wireless data network and the second wireless data network following migration of the plurality of network devices responsive to the enrollment priorities having been advertised;
the causing including changing the enrollment priorities to updated enrollment priorities to be advertised by the respective first and second root network devices, respectively, for causing an updated plurality of network devices to migrate between the first wireless data network and second wireless data network.

6. The method of claim 1, wherein:
the current load for each of the first wireless data network and the second wireless data network includes a corresponding number of member network devices;
the causing including setting a first migration rate based on setting a first difference between the enrollment priorities for a first identified interval, and setting a second migration rate based on setting a second difference between the enrollment priorities for a second identified interval following the first identified interval.

7. The method of claim 1, wherein:
the first determining includes determining the current load based on determining, for each of the first wireless data network and the second wireless data network, a corresponding health factor;
the causing includes selecting a migration rate based on respective health factors, determining a schedule for causing the plurality of network devices to migrate relative to the migration rate, and setting the enrollment priorities according to a selected difference corresponding to the migration rate according to the schedule.

8. The method of claim 7, wherein the causing includes predicting the schedule and the migration rate based on metrics received from the respective first and second root network devices.

9. The method of claim 7, wherein the causing further includes selectively setting a minimum rank requirement for migration, and sending the minimum rank requirement to the second root network device, the minimum rank requirement preventing a network device having a rank in the first wireless data network from migration to the second wireless data network if the rank is less than the minimum rank requirement.

10. The method of claim 1, further comprising halting further migration between the first wireless data network and the second wireless data network based on sending equal-value enrollment priorities to the respective first and second root network devices.

11. One or more non-transitory tangible media encoded with logic for execution by a machine and when executed by the machine operable for:
first determining, by the machine implemented as a Wi-SUN (Wireless Smart Utility Network) controller device, a current load and a target load for each of at least a first wireless data network and a second wireless data network, wherein the first wireless data network and the second wireless data network are rooted by respective first and second root network devices, and wherein the target load represents a desired goal state for distributing load between the first wireless data network and the second wireless data network;
determining, by the Wi-SUN controller device and based on a difference between the current load and the target load for each of the first wireless data network and the second wireless data network, that a plurality of network devices need to migrate from the first wireless data network to the second wireless data network; and
causing, by the Wi-SUN controller device, the plurality of network devices to attach to the second wireless data network and not the first wireless data network, based on the Wi-SUN controller device sending enrollment priorities to be advertised by the respective first and second root network devices.

12. The one or more non-transitory tangible media of claim 11, wherein the first determining includes determining the current load as:
an encountered load by each of the first wireless data network and the second wireless data network based on network loading metrics received from the respective first and second root network devices, respectively.

13. The one or more non-transitory tangible media of claim 11, wherein the causing includes controlling a rate of migrating from the first wireless data network to the second wireless data network, based on controlling a relative difference between the enrollment priorities to be advertised by the respective first and second root network devices, respectively.

14. The one or more non-transitory tangible media of claim 11, further operable for:
detecting, by the Wi-SUN controller device, updated loads in the first wireless data network and the second wireless data network following migration of the plurality of network devices responsive to the enrollment priorities having been advertised;
the causing including changing the enrollment priorities to updated enrollment priorities to be advertised by the respective first and second root network devices, respectively, for causing an updated plurality of network devices to migrate between the first wireless data network and second wireless data network.

15. The one or more non-transitory tangible media of claim 11, wherein:
the current load for each of the first wireless data network and the second wireless data network includes a corresponding number of member network devices;
the causing including setting a first migration rate based on setting a first difference between the enrollment priorities for a first identified interval, and setting a second migration rate based on setting a second difference between the enrollment priorities for a second identified interval following the first identified interval.

16. The one or more non-transitory tangible media of claim 11, wherein:

the first determining includes determining the current load based on determining, for each of the first wireless data network and the second wireless data network, a corresponding health factor;

the causing includes selecting a migration rate based on respective health factors, determining a schedule for causing the plurality of network devices to migrate relative to the migration rate, and setting the enrollment priorities according to a selected difference corresponding to the migration rate according to the schedule.

17. The one or more non-transitory tangible media of claim 16, wherein the causing includes predicting the schedule and the migration rate based on metrics received from the respective first and second root network devices.

18. The one or more non-transitory tangible media of claim 16, wherein the causing further includes selectively setting a minimum rank requirement for migration, and sending the minimum rank requirement to the second root network device, the minimum rank requirement preventing a network device having a rank in the first wireless data network from migration to the second wireless data network if the rank is less than the minimum rank requirement.

19. The one or more non-transitory tangible media of claim 11, further operable for halting further migration between the first wireless data network and the second wireless data network based on sending equal-value enrollment priorities to the respective first and second root network devices.

20. An apparatus implemented as a physical machine, the apparatus comprising:

non-transitory machine readable media configured for storing executable machine readable code;

a device interface circuit configured for Wi-SUN (Wireless Smart Utility Network) communications with first and second wireless data networks rooted by respective first and second root network devices; and a processor circuit configured for executing the machine readable code, and when executing the machine readable code operable for:

first determining a current load and a target load for each of at least a first wireless data network and a second wireless data network, wherein the first wireless data network and the second wireless data network are rooted by respective first and second root network devices, and wherein the target load represents a desired goal state for distributing load between the first wireless data network and the second wireless data network;

determining, based on a difference between the current load and the target load for each of the first wireless data network and the second wireless data network, that a plurality of network devices need to migrate from the first wireless data network to the second wireless data network; and causing the plurality of network devices to attach to the second wireless data network and not the first wireless data network, based on the apparatus sending enrollment priorities to be advertised by the respective first and second root network devices.

\* \* \* \* \*